United States Patent [19]

Nagano et al.

[11] Patent Number: 4,759,327

[45] Date of Patent: Jul. 26, 1988

[54] APPARATUS FOR CONTROLLING AN INTERNAL COMBUSTION ENGINE

[75] Inventors: Masami Nagano, Katsuta; Seiji Suda, Mito; Takeshi Atago; Masahide Sakamoto, both of Katsuta, all of Japan

[73] Assignee: Hitachi, Ltd., Tokyo, Japan

[21] Appl. No.: 904,399

[22] Filed: Sep. 8, 1986

[30] Foreign Application Priority Data

Sep. 20, 1985 [JP] Japan .................................. 60-208082

[51] Int. Cl.$^4$ ........................... F02P 5/15; F02D 41/04
[52] U.S. Cl. ..................................... 123/419; 123/436; 364/431.08
[58] Field of Search .............................. 123/419, 436; 364/431.08

[56] References Cited

U.S. PATENT DOCUMENTS

| 4,345,559 | 8/1982 | Kuttner et al. | 123/436 X |
| 4,355,614 | 10/1982 | Hayashi et al. | 123/436 |
| 4,498,438 | 2/1985 | Sato | 123/416 X |
| 4,527,523 | 7/1985 | Daumer et al. | 123/436 X |

FOREIGN PATENT DOCUMENTS

| 23037 | 2/1984 | Japan | 123/436 |
| 231144 | 12/1984 | Japan | |
| 30446 | 2/1985 | Japan | |

Primary Examiner—Tony M. Argenbright
Attorney, Agent, or Firm—Antonelli, Terry & Wands

[57] ABSTRACT

In an apparatus for controlling an internal combustion engine having a fuel injection control system, the detected number of revolutions is so modified that it becomes higher than an actual number of revolutions when a changing rate of the number of revolutions is larger than a predetermined value and the actual number of revolutions tends upward, and lower than the actual one when the changing rate is larger than the predetermined value and the actual number of revolutions tends downward. The quantity of fuel to be injected is calculated on the basis of the thus modified number of revolutions. According to the present invention, the deceleration shock or surging occurring during the low speed running of an automobile can be effectively diminished without any deterioration of the exhaust gas.

4 Claims, 7 Drawing Sheets (a) REVOLUTIONS N

(b) COMPENSATED IGN. ANGLE (ADV)

(a) REVOLUTIONS N (b) COMPENSATED IGN. ANGLE (ADV)

APPARATUS FOR CONTROLLING AN INTERNAL COMBUSTION ENGINE

BACKGROUND OF THE INVENTION

1. Field of the Invention

The present invention relates to an apparatus for controlling an internal combustion engine for use in an automobile, which is capable of preventing shock or surging occurring when the automobile runs in the low speed region.

2. Description of the Related Art

In an internal combustion engine for use in an automobile, which has a fuel injection control system, and in which the injection time, i.e., the amount of the fuel to be injected, is determined according to the load of the engine (intake of air or pressure in a suction pipe) and the number of revolutions of the engine, it is known that deceleration shock or surging (fluctuation of acceleration) occurs when a throttle valve is abruptly closed for the purpose of decelerating the automobile running at the low speed. This phenomenon results from the fact that the intake of air (or the pressure in the suction pipe) is sharply reduced due to the abrupt closing of the throttle valve and accordingly the injection time, which is originally calculated based on the intake of air, is also extremely reduced. As a result, the air/fuel ratio of mixture within a combustion chamber becomes large and over-lean condition is brought about, so that the necessary torque is not generated and a so called minus torque is caused. This minus torque resonates with a characteristic frequency of the automobile to produce a shock or surging. To prevent this, in the Japanese Patent Laid-open Publication No. 59-231144, for example, when a throttle valve is closed under a certain operational condition, the injection time is maintained at the value just existing before the closure of the throttle valve for a predetermined duration, and after that the injection time is slowly shortened.

Further, there is an internal combustion engine, in which, upon engine braking, fuel is cut if the number of revolutions of the engine is higher than a predetermined value. When the injection of fuel is restarted, the control of decreasing fuel is undertaken in order to prevent acceleration shock caused by the abrupt increase of fuel. In such a control, fuel which has adhered to an inner wall of a suction pipe is completely evaporated during the fuel cut and, after restart of injection, injected fuel is consumed to wet the inner wall of the suction pipe, so that the over-lean condition is temporarily caused in a combustion chamber. This also results in occurrence of shock or surging. To prevent the shock or surging of this kind, in the Japanese Patent Laid-open Publication No. 60-30446, for example, the injection time is increased by a predetermined rate, after it was once decreased upon restart of the injection.

In the prior art as described above, whether the shock or surging is actually occurring or not, the control for preventing the shock or surging, i.e., the enrichment of fuel, is always executed in the deceleration process of the automobile. Therefore, the prior art is in danger of deteriorating the performance of purification of exhaust gas. Besides, the prior art provides no effect against the surging which occurs during a constant speed running of the automobile, which is caused by the irregular combustion in the engine, the condition of a road surface and so on.

SUMMARY OF THE INVENTION

An object of the present invention is to provide an apparatus for controlling an internal combustion engine, which can prevent deceleration shock or surging from occurring during the low speed running of an automobile, without deteriorating the performance of purification of exhaust gas.

A feature of the present invention is that, in an internal combustion engine the output of which is controlled by varying the amount of fuel to be injected and the timing of ignition in accordance with parameters representative of the operational condition of the engine including at least the number of revolutions of the engine, the output of the engine is adjusted decreasingly when a changing rate of the number of revolutions of the engine is positive and its absolute value is larger than a predetermined value, and the output of the engine is adjusted increasingly when the changing rate of the number of revolutions of the engine is negative and its absolute value is larger than the predetermined value.

According to the present invention, the control for diminishing the deceleration shock or surging is executed only when it is actually detected and at the early time of its occurrence. Therefore, the deterioration of the purification of exhaust gas can be avoided, since the mixture supplied for the engine is not enriched more than necessary. In addition, the present invention functions effectively against the surging which occurs when an automobile is running at a constant speed.

Other objects, features and advantages of the present invention will become apparent upon reading the specification and inspection of the drawings.

BRIEF DESCRIPTION OF THE DRAWINGS

FIG. 1 schematically shows the construction of an internal combustion engine to which the present invention is applied;

FIGS. 3(a-b) explain the method of detecting the surging in the present invention;

FIGS. 4(a-c) explain the filtering operation used in an embodiment of the present invention;

FIGS. 5(a-b) show the relationship between the number of revolutions and the fuel injection period, when the compensation operation according to the embodiment of the present invention is conducted;

FIGS. 7(a-b) show the relationship between the number of revolutions and the compensated ignition angle, when the compensation operation according to another embodiment of the present invention is conducted;

FIGS. 10(a-c) show the effect of the present invention at the time of the deceleration of an automobile, compared with the prior art; and FIGS. 11(a–b) show the effect of the present invention during the constant speed running of an automobile, compared with the prior art.

DESCRIPTION OF THE PREFERRED EMBODIMENTS

Referring at first to FIG. 1, a brief explanation will be provided concerning the overall construction of an internal combustion engine, to which the present invention is applied. In the figure, reference numeral 10 denotes an engine, in which a combustion chamber 14 is defined by a cylinder 12 and a piston 16. To the combustion chamber 14 there are coupled one end of a suction pipe 18 and one end of an exhaust pipe 20. The other end of the suction pipe 18 is coupled through a collector portion 22 to a throttle body 24, in which a throttle valve is equipped. The throttle body 24 is coupled to an air cleaner 28 through a duct 26. Reference numeral 30 denotes an inlet of the air cleaner 28. The quantity of air sucked into the engine 10 is measured by an airflow meter 32 attached to a part of the duct 26. As the airflow meter 32, a hot wire type airflow meter can be employed, for example. A signal representative of the intake of air measured by the airflow meter 32 is sent to a control unit 34.

To a part of the suction pipe 18 there is attached a fuel injecting valve (injector) 36, which injects fuel supplied by a fuel pump 40 from a fuel tank 38 through a damper 42 and a filter 44, into the air sucked by the engine 10 for the opening duration thereof, which is varied in response to a signal from the control unit 34. By adjusting this opening duration (injection time), the air/fuel ratio of a mixture of air and fuel sucked into the combustion chamber 14 can be controlled. Further, there is provided a fuel pressure regulator 46, by which a part of the fuel is returned to the tank 38 when the pressure of fuel supplied to the injector 36 exceeds a predetermined value.

To the control unit 34 are given the following signals, in addition to the aforesaid signal of the quantity of air. One of them is, at first, a signal indicating the number of revolutions of the engine, which is sent from a crank angle sensor assembled within a distributor 48. Next is a signal from an idle switch attached to the throttle body 24, which represents that the throttle valve is closed. The control unit 34 also receives a signal from a cooling water temperature sensor 50, whereby the temperature of the engine 10 is taken into the control unit 10. Receiving these signals, the control unit 34 produces signals to the injector 36, the fuel pump 40 and an ignition coil 52. The signal to the ignition coil 52 controls the timing of generation of the high voltage which is supplied to the distributor 48, i.e., this signal adjusts the output of the engine 10 by varying the ignition timing.

Figure 2:
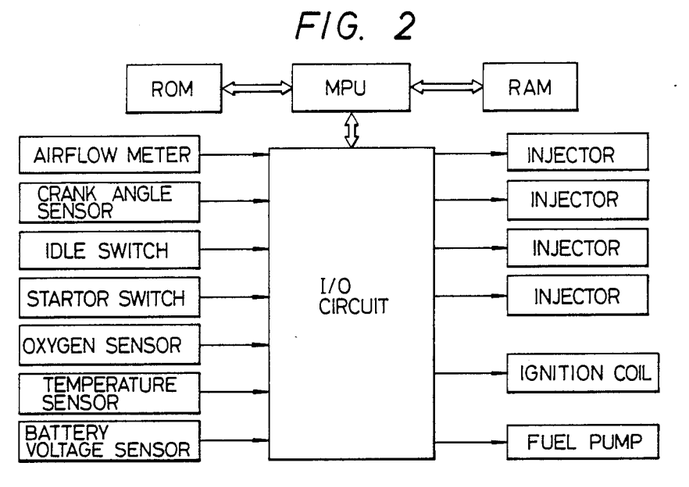
FIG. 2 is a block diagram roughly showing the construction of a control unit shown in FIG. 1.

FIG. 2 roughly shows the construction of the control unit 34 mentioned above. As is apparent from the drawing, the control unit 34 is formed by a known microprocessor comprising a processing unit (MPU), a read-only memory (ROM) and a random access memory (RAM) which are connected through busses. Further, to the MPU, an input/output (I/O) circuit is connected through a bus. Through this circuit, the MPU receives signals from a starter switch, an oxygen sensor and a battery voltage sensor, as well as the signals from the airflow meter, the crank angle sensor, the idle switch and the cooling water temperature sensor, which have been already described with reference to FIG. 1. Further, sensors or devices to be connected with the I/O circuit should not be construed in such a manner that they are limited to those described here or that they all are required for the implementation of the present invention. Receiving the signals from those sensors and devices, the MPU executes a predetermined processing and outputs the signals to the injectors, the ignition coil and the fuel pump through the I/O circuit. Although only one injector 36 is indicated in FIG. 1, it is to be understood that there are provided in this case one injector for every cylinder of a four cylinder engine.

Figure 3:
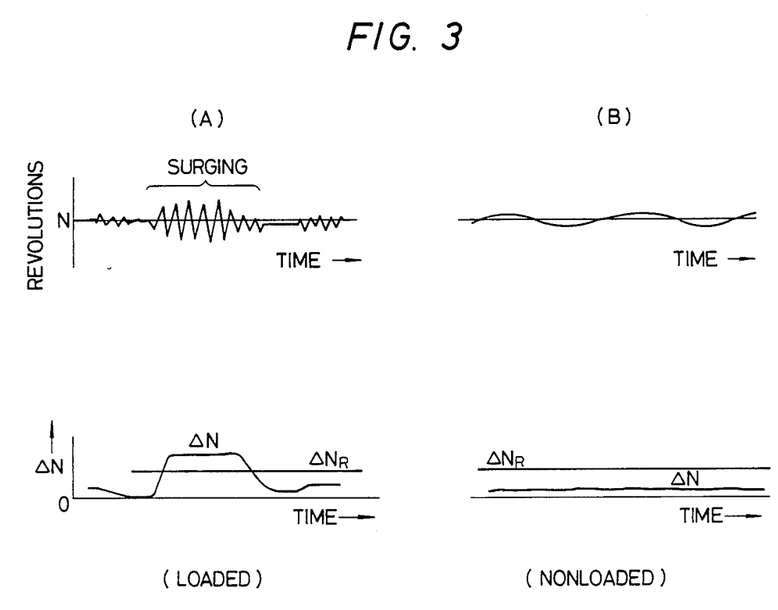
Figure 4:
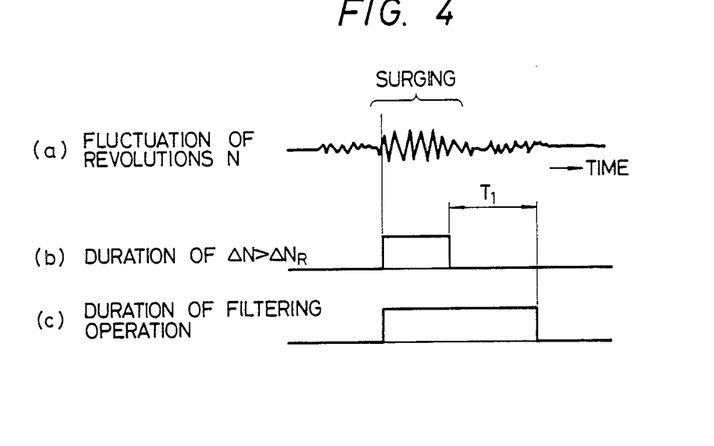
Figure 5:
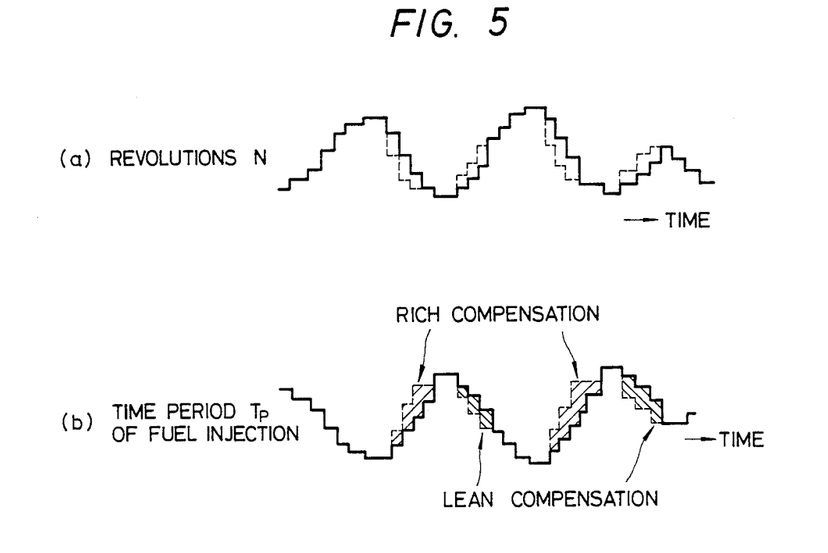

Referring next to FIGS. 3 to 5, an explanation will be provided of the principle of the detection of the shock or surging and the diminishing method thereof according to an embodiment of the present invention.

If surging occurs, the number of revolutions of the engine 10 fluctuates. Further, as is apparent from FIGS. 3(A) and 3(B), when the fluctuation at the time of the loaded condition of the engine is compared with that under the non-loaded condition, the degree of the fluctuation is different to a great extent. Namely, a changing rate $\Delta N$ of the number of revolutions of the engine under the loaded condition is much larger than that of the engine under the non-loaded condition. Then, the fluctuation in the number of revolutions caused by the surging can be discriminated by providing an appropriate threshold $\Delta N_R$.

FIG. 4 is a chart showing the timing of the detection of the surging and the operation for diminishing it. Assuming that the number of revolutions fluctuates as shown in FIG. 4(a) due to the surging, the signal as shown in FIG. 4(b) appears for the duration of $\Delta N \geq \Delta N_R$. The filtering operation, which is described in detail later, starts simultaneously with the appearance of the signal of FIG. 4(b) and continues until the time T1 after the disappearance of the signal of FIG. 4(b).

Next, the filtering operation will be explained, referring to FIG. 5. The filtering operation is executed by a so called recursive digital filter represented by the following formula.

(wherein N represents the number of revolutions modified by this filtering processing, which is utilized for the calculation for the fuel injection period (the width of the fuel injection pulse) of this time, $N_y$ denotes an actual number of revolutions taken for the filtering operation of this time, $N_{y-1}$ represents the modified number of revolutions, which has been used for the calculation of the fuel injection period of the last time, and G denotes a constant.)

Here let us assume that the number of revolutions of the engine fluctuates as shown by a solid line in FIG. 5(a). In the figure, the number of revolutions fluctuates stepwise, because it is shown in the form of the signal taken into the control unit 34, i.e., the solid line represents the change in sampling values, which is taken into the control unit 34 every sampling period. If the filtering processing as described above is applied to the signal of the number of revolutions as shown by the solid line in FIG. 5(a), the signal is changed as shown by a broken line in FIG. 5(a). The value indicated by the broken line is N obtained by the aforesaid formula. As apparent from the figure, when the actual number of revolutions changes decreasingly, the modified number of revolutions is made lower than the actual one. To the contrary, when the actual number of revolutions changes increasingly, the modified number of revolutions is made higher than the actual one. This is the meaning of the filtering operation indicated by the aforesaid formula. The filtering processing is executed y times (this appears as the number of steps seen in the figure) from the instances when the number of revolution changes from increase to decrease and vice versa. The number y of times of the filtering processing depends on the characteristic frequency of the automobile. Therefore, it must be finally fixed by experiment.

The period $T_p$ of the fuel injection is calculated on the basis of the thus modified number of revolutions. The way of obtaining the injection period $T_p$ is the same as the well known method, namely, it is basically obtained from the relation $Q_a/N$, wherein $Q_a$ is the quantity of the suction air and N is the number of revolutions of the engine. The number of revolutions obtained by the modification of the filtering processing is used as N in the above mentioned relation.

The thus obtained injection period $T_p$ becomes as shown by a broken line in FIG. 5(b). A solid line in the figure indicates the injection period $T_p$ calculated on the basis of the number of revolutions shown by the solid line in FIG. 5(a), i.e., without the modification of the number of revolutions according to the filtering processing. For the convenience of the following explanation, the former injection period is called a compensated injection period and the later one an original injection period, hereinafter. As apparent from the figure, when the number of revolutions of the engine changes decreasingly, the injection period is compensated so as to be longer than the original one, whereby the output of the engine is increased and the fall of the number of revolutions is moderated. To the contrary, when the number of revolutions of the engine changes increasingly, the injection period is compensated so as to be shorter than the original one, whereby the output of the engine is decreased and the increase of the number of revolutions is also moderated. The hatched portions in FIG. 5(b) represent the compensated amount of the injection period.

Figure 6:
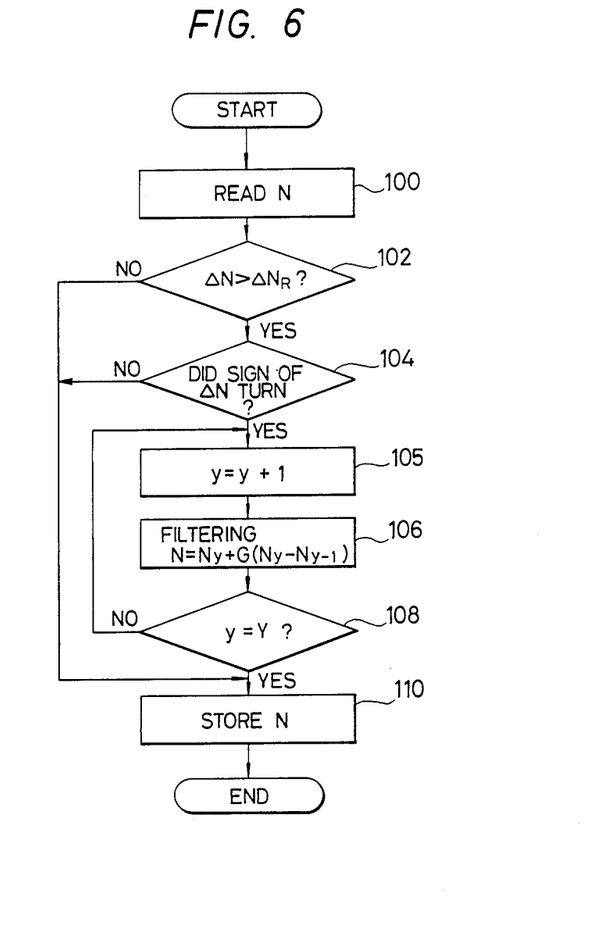
FIG. 6 is a flow chart showing the operation of a control apparatus according to the embodiment of the present invention, the operation according to the flow chart being executed in the control unit shown in FIG. 2.

The above described operation is executed by the MPU included in the control unit 34 in accordance with an operation flow shown in FIG. 6. Next, an explanation will be provided of the operation flow.

After the operation starts, the number N of revolutions is sampled at a predetermined sampling time and is read into the MPU at step 100. At step 102, a changing rate $\Delta N$ is calculated from N read at this sampling time and N' read at the last sampling time, and it is discriminated at step 102 whether $\Delta N \geq \Delta N_R$. If $\Delta N < \Delta N_R$, the operation jumps to step 110, and N read at this sampling time is stored into a predetermined address of the storage. When $\Delta N \geq \Delta N_R$, it is discriminated at step 104 whether the sign of the changing rate $\Delta N$ changed. If not, the operation jumps to step 110. When the sign of the changing rate N has changed, the operation enters into the filtering process consisting of steps 105 to 108. In this process, the filtering operation is repeated Y times. After accomplishing the filtering process, the operation goes to step 110, at which the number N of revolutions read at step 100 is stored into the predetermined address of the storage.

As described above, the control for suppressing the shock or surging is executed only when it is actually detected (cf. step 102). In addition, as apparent from FIG. 5(b), the rich compensation always accompanies the lean compensation. As a whole, the mixture sucked into the combustion chamber is scarcely enriched. Therefore, the exhaust gas is not deteriorated.

Figure 7:
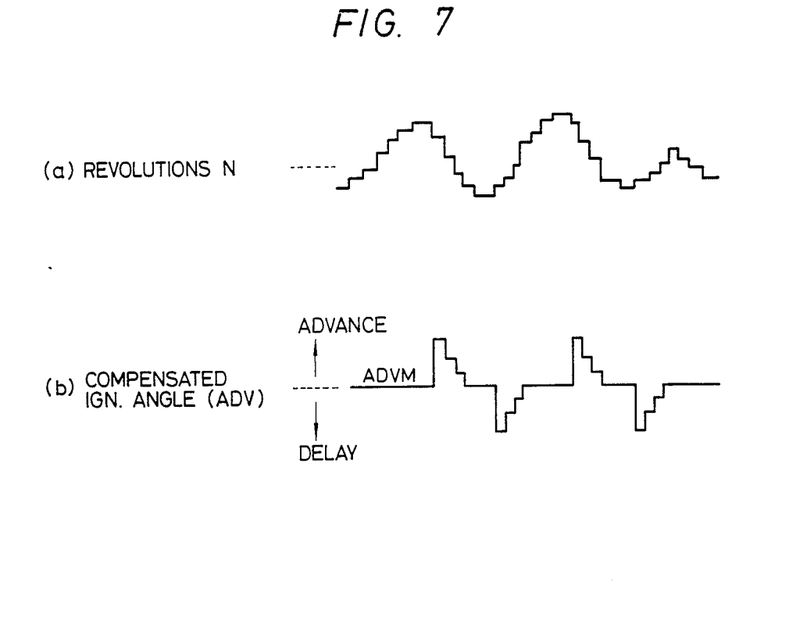

In the following there will be explained another embodiment with reference to FIGS. 7 to 9. As is well known, the output of the internal combustion engine can be also adjusted by controlling the ignition timing. The ignition is usually conducted at the single read out from an ignition timing map stored in the storage in accordance with detected parameters indicative of the operational condition of the engine.

Then, assuming that, when the engine is operated with the ignition timing ADVM read out from the map, the fluctuation of the number of revolutions occurs as shown in FIG. 7(a). In this embodiment, when the number of revolutions of the engine changes decreasingly, the ignition timing is advanced with respect to ADVM, whereby the output of the engine is increased and the fall of the number of revolutions is moderated. When the number of revolutions of the engine changes increasingly, the ignition timing is delayed with respect to ADVM, whereby the output of the engine is decreased and the increase of the number of revolutions is moderated.

Figure 8:
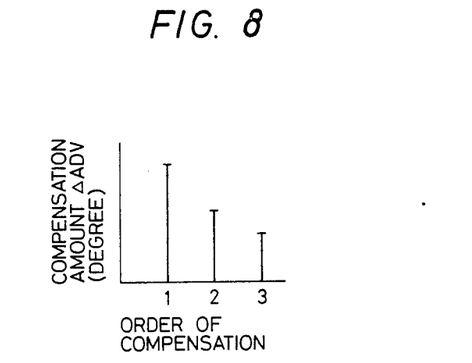
FIG. 8 shows an example of a manner of compensation according to the another embodiment.

FIG. 8 shows an example of the compensation amount. In the figure, the abscissa indicates the order of the compensating operations counted from their commencement. Namely, the amount of the compensation is varied in accordance with the order of the compensating operation. Further, the ordinate indicates the absolute value $\Delta ADV$ of the compensating amount. When the number of revolutions changes decreasingly, the values $\Delta ADV$ corresponding to the respective orders of compensation are added to the present ignition angle ADVM read out from the ignition timing map. To the contrary, when the number of revolutions changes increasingly, the values $\Delta ADV$ corresponding to the respective orders of compensation are subtracted from the present ignition angle ADVM. The relation as shown in FIG. 8 can be stored in the form of a table in the storage.

Further, the compensating amount shown in FIG. 8 is decreased every time of the compensation. However, the manner of selecting the compensating amounts for respective times is not limited thereto. For example, the compensating amount of the second time can be selected to be larger than that of the first time. It is desirable that the largest amount is made to correspond to the compensation of the time at which the changing rate of the number of revolutions indicates its maximal value. According to this, the largest compensation is added, when the number of revolutions is changing most sharply, so that the effect of diminishing the shock or surging is enhanced.

Figure 9:
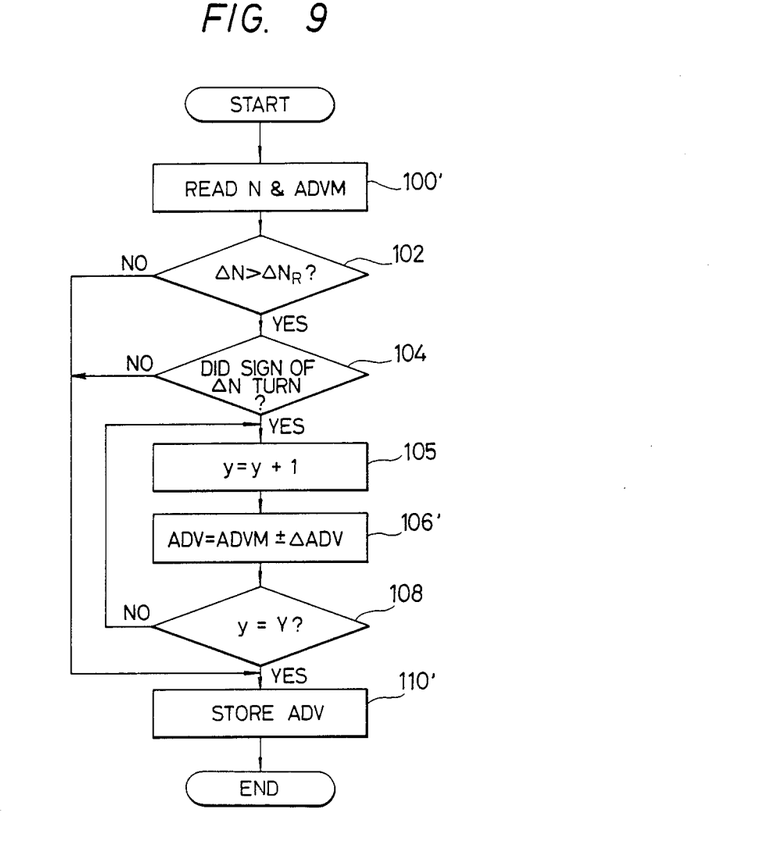
FIG. 9 is a flow chart showing the operation of a control apparatus according to the another embodiment of the present invention, the operation of this flow chart being executed in the control unit shown in FIG. 2.

The above mentioned operation is executed by the MPU in the control unit 34 in accordance with an operation flow shown in FIG. 9. The operation flow of this figure is almost the same as that of FIG. 6. Step 106' is a main point, which is different from the flow of FIG. 6. It is easily understood that the operation of this step 106' is as described above.

As a modification of this embodiment, the following is considered. At step 106', the calculation for compensating an injection period $T_p$ is executed instead of the calculation for compensating the ignition timing ADV as shown in FIG. 9. Namely, a compensated injection period $T_p$ is obtained by varying the injection period $T_p'$ calculated on the basis of an actual number of revolutions (not a modified number of revolutions) by a constant amount or a constant rate, which is appropriately selected.

Figure 10:
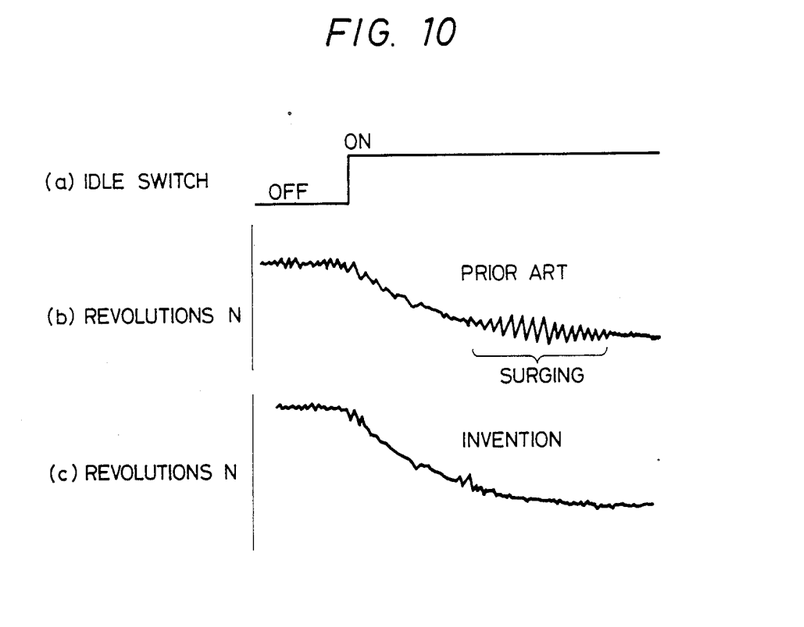
Figure 11:
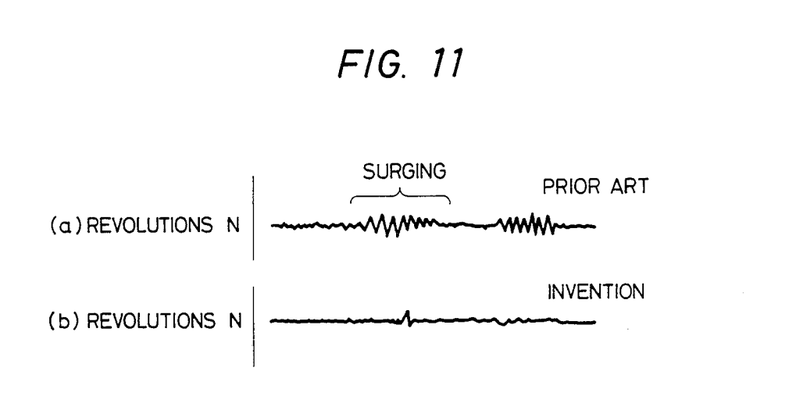

FIGS. 10 and 11 show the effect of the present invention, compared with the prior art, in which FIG. 10 shows the effect at the time of the deceleration of an automobile and FIG. 11 shows the effect in the constant speed running. It will be understood that, according to the present invention, the surging is diminished in both cases of the deceleration and the constant speed running.

Further, it is to be understood that the embodiments mentioned above can be effectively used independently or in combination thereof. For example, upon detection of the occurrence of the shock or surging, if the compensation for both the fuel injection and the ignition timing is conducted, the effect of diminishing the shock or surging is further enhanced.

Although we have herein shown and described only some forms of apparatus embodying our invention, it is understood that further changes and modifications may be made therein within the scope of the appended claims without departing from the spirit and scope of our invention.

We claim:

1. An apparatus for controlling an internal combustion engine, comprising:
    ignition means for igniting a combustible mixture in the cylinders of the engine in accordance with an ignition signal;
    speed detecting means for detecting the number of revolutions per unit time of the engine to produce a speed signal in proportion thereto; and
    a control unit, including a processing unit, a read-only memory connected to the processing unit through a bus and in which a program for operating the processing unit is stored, and a random access memory connected to the processing unit through the bus for storing an ignition timing map and a map of compensation amounts for an ignition timing, the processing unit being programmed so as to comprise means for:
    sampling the speed signal produced by said speed detecting means and reading an ignition timing signal from the ignition timing map in response to the value of said speed signal at a predetermined sampling period;
    detecting a deviation between the number of revolutions detected at a previous sampling period and that sampled in the present sampling period;
    discriminating whether or not the obtained deviation exceeds a predetermined value, and outputting the ignition timing signal as the ignition signal to said ignition means when the deviation is less than the predetermined value;
    detecting a change in the sign of the deviation after it is determined that the deviation exceeds the predetermined value;
    executing a compensation operation for an ignition timing signal read out from the ignition timing map for only a predetermined number of the sampling periods from the time of detection of the change in the sign of the deviation such that a compensation amount read out from the compensation amount map is added to the ignition timing signal, when the number of revolutions changes with a decreasing tendency, and the compensation amount is subtracted from the ignition timing signal, when the number of revolutions changes with an increasing tendency, for said predetermined number of sampling periods; and
    producing a compensated ignition timing as the ignition signal to said ignition means.

2. An apparatus for controlling an internal combustion engine as defined in claim 1, wherein the compensation amounts are different for every sampling period within the compensation operation.

3. An apparatus for controlling an internal combustion engine as defined in claim 2, wherein the compensation amount for the first sampling period is largest and thereafter is smaller for every sampling period.

4. An apparatus for controlling an internal combustion engine as defined in claim 2, wherein the compensation amount is largest at the sampling period within the compensation operation at which the change of the ignition timing causes the largest change in an output of the engine.

* * * * *